(12) United States Patent
Yerushalmi-Rozen et al.

(10) Patent No.: US 7,501,108 B2
(45) Date of Patent: Mar. 10, 2009

(54) METHOD FOR THE PREPARATION OF STABLE SUSPENSIONS AND POWDERS OF SINGLE CARBON NANOTUBES

(75) Inventors: Rachel Yerushalmi-Rozen, D.N. Beertuvia (IL); Oren Regev, Moshav Beertuvia (IL)

(73) Assignee: Ben-Gurion University of the Negev Research & Development Authority, Beer-Sheva (IL)

( * ) Notice: Subject to any disclaimer, the term of this patent is extended or adjusted under 35 U.S.C. 154(b) by 550 days.

(21) Appl. No.: 10/667,204

(22) Filed: Sep. 18, 2003

(65) Prior Publication Data
US 2004/0131859 A1 Jul. 8, 2004

Related U.S. Application Data

(63) Continuation of application No. PCT/IL02/00237, filed on Mar. 25, 2002.

(30) Foreign Application Priority Data

Mar. 26, 2001 (IL) .................................. 142254

(51) Int. Cl.
*D01F 9/12* (2006.01)
(52) U.S. Cl. ................. 423/447.1; 423/447.2; 423/460; 428/36.4
(58) Field of Classification Search ............. 423/447.2, 423/447.1, 460; 977/742, 748, 753; 428/36.4
See application file for complete search history.

(56) References Cited

U.S. PATENT DOCUMENTS 3,852,076 A * 12/1974 Grasko ....................... 523/216
3,856,699 A * 12/1974 Miyano et al. ............. 427/2.15
5,114,477 A * 5/1992 Mort et al. .................. 106/31.6
5,576,162 A * 11/1996 Papadopoulos ............. 430/527
6,020,422 A * 2/2000 Connors et al. ............. 524/716

OTHER PUBLICATIONS

Bandyopadhyaya, R., et al., "Stabilization of Individual Carbon Nanotubes in Aqueous Solutions," Nov. 22, 2001, American Chemical Society, Nano Letters, vol. 2, No. 1, pp. 25-28.*
Albert L. Lehninger, Biochemistry, 249 (2d ed., Worth Publishers 1975).*
Lai, et al., Complexation of C60 Fullerene with Cholesteryl Group-Bearing Pullulan in Aqueous Medium, Chem. Ltrs. 2000: 64.*

(Continued)

*Primary Examiner*—Stuart L. Hendrickson
*Assistant Examiner*—Daniel C. McCracken
(74) *Attorney, Agent, or Firm*—Martin Fleit; Paul D. Bianco; Fleit Gibbons Gutman Bongini & Bianco PL

(57) ABSTRACT

A method is provided for exfoliation of carbon nanotubes and for the preparation of a stable aqueous suspension thereof containing dispersed, essentially single tubes, using a water-soluble polymeric material. A powder of carbon nanotubes is further provided, that can be re-dispersed to form a stable suspension. The nanotubes can be used in electronics, printing, coatings, thin layers, molecular machines, and for the production of composite materials.

19 Claims, 5 Drawing Sheets

OTHER PUBLICATIONS

Ausman, et al., Organic Solvent Dispersions of Single-Walled Carbon Nanotubes: Toward Solutions of Pristine Nanotubes, J. Phys. Chem. B 2000; 104(38): 8911.*

Satishkumar, et al., Novel experiements with carbon nanotubes: opening, filling, closing and functionalizing nanotubes, J. Phys. B: At. Mol. Opt. Phys. 1996; 29: 4925-4934.*

Ausman, et al, Organic Solvent Dispersions of Single-Walled Carbon Nanotubes: Pristine Nanotubes, J. Phys. Chem. 2000; 104(38): 8911-8915.*

Satishkumar, et al., Novel experiements with carbon nanotubes: opening, filling, closing and functionalizing nanotubes, J. Phys. B: At. Mol. Opt. Phys. 1996; 29: 4925-4934.*

Ausman, et al, Organic Solvent Dispersions of Single-Walled Carbon Nanotubes: Pristine Nanotubes, J. Phys. Chem. 2000; 104(38): 8911-8915.*

Qian, et al., Load transfer and deformation mechanisms in carbon nanotube-polystyrene composites, Applied Physics Letters 2000; 76(20): 2868-2870.*

Sinha, et al., A novel approach to bulk synthesis of carbon nanotubes filled with metal by a catalytic chemical vapor deposition method, Chemical Physics Letters 2000; 332: 455-460.*

Liu, et al., Fullerene Pipes, Science 1998; 280: 1253-1256.*

Allen, Kim. The Fullerene Site, "Carbon Nanotubes", http://kimalen.sheepdogdesign.net/Fuller/nanotubes.html; accessed on Mar. 10, 2008.

International Search Report for PCT/IL02/00237.

International Preliminary Examination Report for PCT/IL02/00237.

W.A. de-Heer et al, "Carbon Nanotube Quantum Resistors", Science 281, vol. 280, Jun. 12, 1998. pp. 1744-1746.

S.J. Tans et al, "Room-temperature tansistor based on a single carbon nanotube", Nature vol. 393, 1998, pp. 49-52.

E.W. Wong et al, "Nanobeam Mechanics: Elasticity, Strength, and Toughness of Nanorods and Nanotubes", Science, vol. 277, Sep. 26, 1997, pp. 1971-1975.

J. Liu et al, "Fullerene Pipes", Science, vol. 280, May 22, 1998, pp. 1253-1256.

S. Sanvito et al, "Fractional Quantum Conductance in Carbon Nanotubes", Physical Review Letters, vol. 84 No. 9, Feb. 28, 2000, pp. 1974-1977.

P.J. de Pablo et al, "Mechanical and Electrical Properties of Nanosized Contacts on Single-Walled Carbon Nanotubes", Advanced Materials, 2000, pp. 573-576.

B. Vigoto et al et al, "Macroscopic Fibers and Ribbons of Oriented Carbon Nanotubes", Science vol. 290, Nov. 17, 2000, pp. 1331-1334.

P. Thess et al, "Crystalline Ropes of Metallic Carbon Nanotubes", Science, vol. 273, Jul. 26, 1996, 483-487, pp. 1-6.

Bandyopadhyaya, Rajdip et al., "Stabilization of individual carbon nanotubes in aqueous solutions", Nano Letters, 2002, pp. 25-28, vol. 2, No. 1.

O'Connell et al., "reversible water-solubilization of single walled carbon nanotubes by polymer wrapping", Chemical Physics Letters, Jul. 13, 2001, pp. 265-271, vol. 342, No. 3-4.

Shaffer et al., "Fabrication and characterization of carbon nanotube/poly(vinyl alcohol) coposites", Advanced Materials, Aug. 3, 1999, pp. 937-941, vol. 11, No. 11, VCH Verlagsgesellschaft, Germany.

Chen et al., "Plasma activation of carbon nanotubes for chemical modification", Journal of Physical Chemistry, Jan. 25, 2001, pp. 618-622, vol. 105, No. 3, ACS, USA.

McCarthy, B. et al., "Complex nano-assemblies of polymers and carbon nanotubes", Nanotechnology, 2001, pp. 187-190, vol. 12, No. 3, IOP Publishing, UK.

Vigolo, Bridget et al., "Dispersions and fibers of carbon nanotubes", Materials Research Society Symposium—Proceedings 2001, Nov. 2000, pp. A1211-A1219, vol. 633, Boston, MA, U.S.A.

Riggs, Jason et al., "Optical limiting properties of suspended and solubilized carbon nanotubes", Journal of Physical Chemistry, Aug. 2000, pp. 7071-7076, vol. 104, No. 30, Washington D.C.. USA.

Shaffer, M. et al., "Dispersion and packing of carbon nanotubes", Carbon, 1998, pp. 1603-1612, vol. 36, No. 11.

Ausman, K. et al., "Organic solvent dispersions of single-walled carbon nanotubes: toward solutions of pristine nanotubes", Journal of Physical Chemistry, Sep. 28, 2000, pp. 8911-8915 vol. 104 No. 38.

M. S. Dresselhaus et al, "Science of Fullerences and Carbon Nanotubes"; 1996, Academic Press, pp. 756-869.

* cited by examiner

METHOD FOR THE PREPARATION OF STABLE SUSPENSIONS AND POWDERS OF SINGLE CARBON NANOTUBES

RELATED APPLICATION

This application is a continuation of International Patent Application No. PCT/IL02/00237 filed Mar. 25, 2002, the contents of which are here incorporated by reference in their entirety.

BACKGROUND OF THE INVENTION

1. Field of the Invention

The present invention relates to the exfoliation of carbon nanotubes and to a method for the preparation of a stable aqueous suspension thereof. The invention also provides for a powder of carbon nanotubes that can be re-dispersed to form a stable suspension. The invention further relates to the use of the carbon nanotubes in electronics, printing, coatings, thin layers, molecular machines, and production of composite materials.

2. Prior Art

Carbon nanotubes, either in form of Single Wall Nanotubes (SWNT) or in form of Multi Wall Nanotubes (MWNT), are macromolecular threads with a typical diameter of few nanometers and a length of up to tens of microns. The single tubes exhibit superior mechanical and electrical properties, Young modulus reaching 1 TPa (M. S. Dresselhaus et al., Science of Fullerens and Carbon Nanotubes, Academic Press, New-York, 1996), and current density $10^9$ $Acm^{-2}$, as well as excellent thermal stability (W. A. de-Haar et al., Science 281 (1998) 1744).

Nanotubes tend to cluster; however, their most desired form is well-separated tubes, of either SWNT or MWNT. Carbon nanotubes are currently at the focus of theoretical and experimental research (S. J. Tans et al., Nature 393 (1998) 49; E. W. Wong et al., Science 277 (1997) 1971).

The superb mechanical properties of carbon nanotubes raise high expectations regarding their utilization as reinforcing fillers in polymeric matrices, forming lightweight super strong meso-composites. In order to fulfill these expectations, good mechanical coupling and in particular, stress transfer between the polymeric matrix and the nanotubes are sought for.

A second discipline in which carbon nanotubes and particularly SWNT hold a promise, is molecular electronics. Here SWNT may fulfill two different roles: They may serve as active components in nano-sized devices such as field-effect transistors and electron emission sources. Alternatively, they may serve as molecular wires, connecting various nano-components.

However, discrepancies are often found between theoretical predictions and experimentally observed properties of carbon nanotubes as they are prepared. The reason is a tendency of carbon nanotubes to crystallize in ropes which are entangled into networks. Van-der-Waals interactions between two tubes lead to their alignment, and to their consequent packing into crystalline ropes which may contain 100 to 500 tubes (J. Liu et al., Science 280 (1998) 1253). The crystalline nature of the ropes gives rise to a characteristic X-ray scattering pattern. The different levels of aggregation of carbon nanotubes were found to affect both their electrical and mechanical behavior (S. Sanvito et al., Phys. Rev. Lett. 84 (2000) 9). Aggregated ropes are fragile, and even when well aligned, do not exhibit the expected electrical properties, such as field-emission intensity.

Current studies focus on manipulation and orientation of the tubes (P. J. de Pablo et al., Advanced Materials (2000) 573). One of the novel approaches is based on the synthesis of dense, ordered arrays of carbon nanotubes on a solid substrate. In some of the reported studies, each entity is a rope rather than a single tube. The aligned ropes exhibit inferior properties in comparison to those expected from well-separated tubes. There is also need of a surface treatment that would lead to better adhesion at the interface between matrix and carbon tubes.

Recently an approach for post-synthesis alignment of carbon nanotubes was described by Vigolo et al. (B. Vigolo et al., Science 290 (2000) 1331). In this method, as-produced SWNT are dispersed in low concentrations, up to 0.35 weight %, in aqueous solutions of an ionic surfactant, sodium dodecylsulfate (SDS). The dispersed ropes are then re-condensed in a shear flow into fibers and ribbons of well aligned ropes.

There is a need for new methods for the interfacial engineering of carbon nanotubes. Efforts for developing a simple method for the dispersion of nanotube networks into single ropes, and ropes into separate tubes, have not been successful. It is therefore an object of the present invention to provide a method for the preparation of stable aqueous dispersions of well separated single carbon nanotubes. Another purpose of the invention is to provide a dry form of well separated carbon nanotubes, easy for storage and manipulation, and ready for use in various fields of applications and technologies, including electronics, and material engineering. It is still another object of the invention to provide an adhesive interface between the carbon tubes and a polymeric matrix where the tubes serve as reinforcing agents for the matrix.

SUMMARY OF THE INVENTION

The present invention relates to the exfoliation of carbon nanotubes and to a method for the preparation of a stable aqueous suspension thereof, comprising adding to an aqueous medium, prior to the addition of carbon nanotubes or thereafter, a water-soluble polymeric material, thereby to separate the nanotubes into dispersed, essentially single tubes. The polymer adsorbs on the carbon tubes, interferes with strong forces between them, prevents their aggregation, and enables the formation of suspensions of polymer-coated carbon nanotubes that are stable, and can be as concentrated as 65 weight percents or more. The polymer-coated tubes may serve as adhesion promotors leading to the formation of highly adhesive interfaces between the tubes and a polymeric matrix. A preferred polymer for preparation of the suspensions is a water soluble polymer, either synthetic or natural one, wherein the mass ratio of polymer to carbon nanotubes ranges preferably from 0.05 to 20.

The invention also provides for a powdered form of single, well separated carbon nanotubes that can be easily re-dispersed to form a stable suspension. The dry form is simple to handle, and enables one to prepare suspensions of desired volumes and concentrations of the well-separated non-aggregated tubes quickly and easily. This form of nanotubes is convenient for storing, manipulating, and immediate use. The invention further relates to the use of the polymer-coated single carbon nanotubes in electronics, printing, coatings, thin layers, molecular machines, and production of composite materials.

BRIEF DESCRIPTION OF THE DRAWINGS

The above and other characteristics and advantages of the invention will be better understood through the following illustrative examples, and with reference to the appended drawings, wherein.

DETAILED DESCRIPTION OF THE INVENTION

Figure 1:
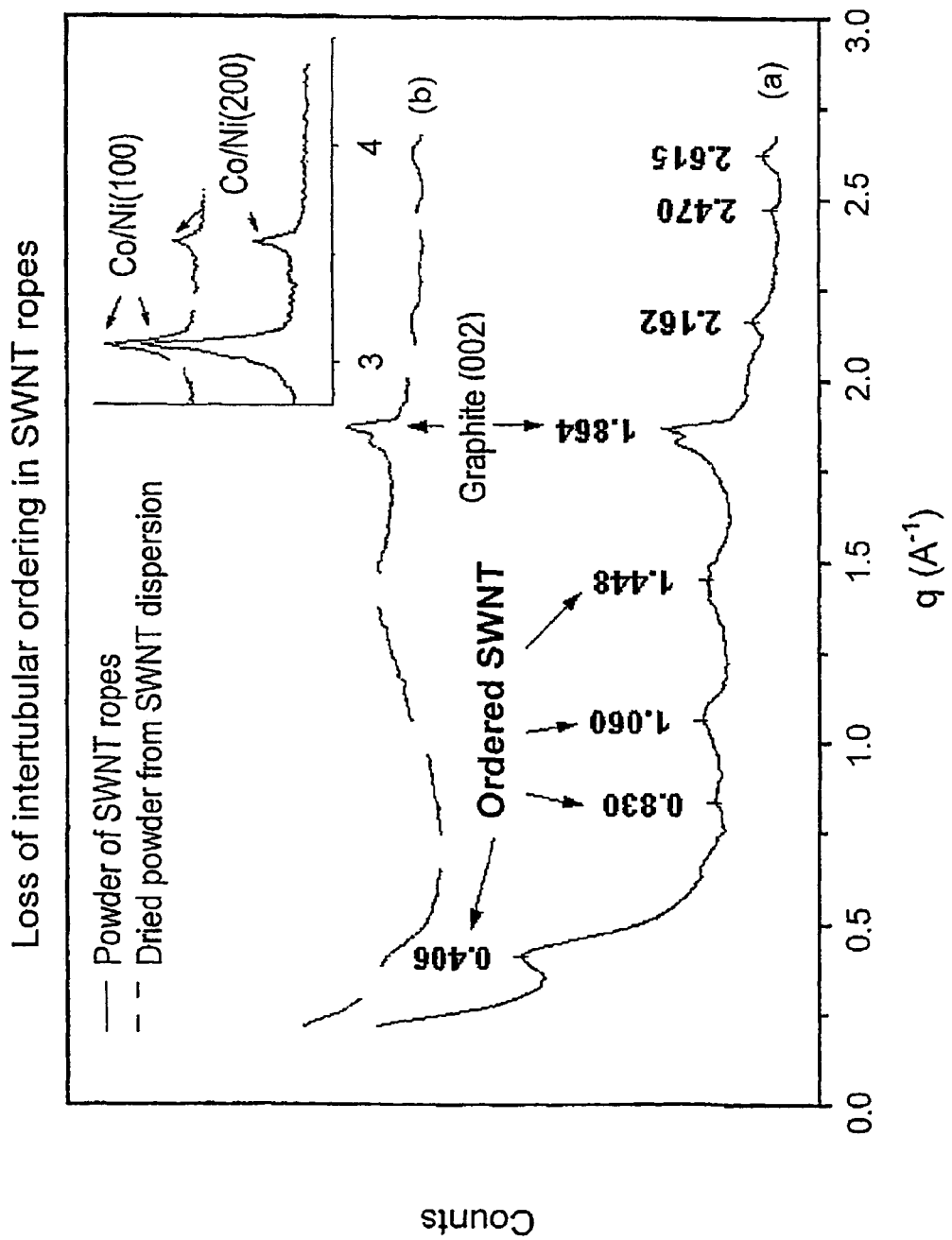
FIG. 1 Shows wide angle x-ray spectra of (a) rope structure of a two-dimensional triangular lattice of as-produced carbon nanotubes, and (b) the wide angle x-ray spectra of a dried powder prepared from a solution with a ratio of 15 wt % gum arabic (GA) to 3 wt % SWNT. Inset shows the reflections of the Co/Ni catalyst used in the synthesis of carbon nanotubes.
Figure 2:
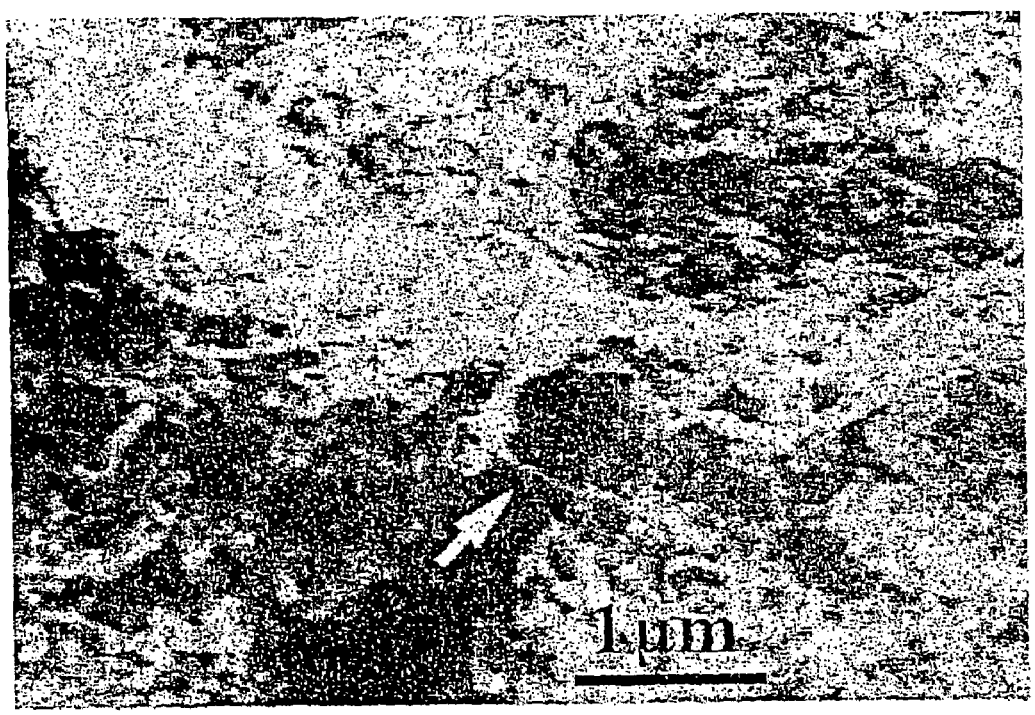
FIG. 2 Is a SEM micrograph of Au spattered as-received nanotube powder, the arrow indicating a single rope.

We discovered that some polymeric compounds enable the preparation of stable aqueous suspensions of single carbon nanotubes. Without committing ourselves to any particular theory, based on our experimental findings (presented in the figures), we suggest that polymers, preferably hydrophilic polymers, adsorb to the carbon tubes and induce an inter-tube repulsion. This prevents their aggregation, and enables the exfoliation of the carbon nanotubes, and the formation of a suspension comprising well separated, polymer-coated single tubes.

A water-soluble polymer and a powder of as-produced nanotubes, containing bundled arrays of ropes, are mixed in any order with water or an aqueous solution. The mixture is then sonicated or mixed by a mixer, and a black, ink-like suspension, is obtained. This suspension, containing separated, polymer-coated tubes, is ready for the intended use. Said suspension is stable for months.

Surprisingly, we found that the above obtained suspension can be dried by known methods, and the powder which is obtained can be easily re-dispersed in pure water or in water solutions to a required concentration of up to 65 weight % (or more) of polymer-coated carbon tubes, wherein shaking, mixing, or sonication can be used for said re-dispersal. The resulting suspension is also stable for months. Said drying, and the removal of water from the suspension of carbon nanotubes, may comprise evaporation, lyophilization, centrifugation, and filtration.

The polymer used in this invention is preferably a hydrophilic polymer, still more preferably a charged polymer, either of natural or synthetic origin, and the mass ratio of said polymer to carbon nanotubes ranges from 0.05 to 20. Said polymer is chosen from polysaccharides and polypeptides. Said polymer can be a water soluble synthetic polymer.

In preferred embodiments of this invention, the polymer comprises gum arabic, carrageenan, pectin, polygalacturonic acid, alginic acid, chitosan, and derivatives thereof.

In a preferred embodiment, gum arabic (GA) is dissolved in deionized water to a concentration of 15%, and as-produced carbon tubes are admixed to a concentration of 3%, followed by sonication at room temperature, the time of sonication being preferably from 5 to 20 minutes.

It has also been found by us (FIG. 3) and others (B. Vigolo et al., Science 290 (2000) 1331) that other surfactants, do not cause the separation of ropes into single tubes, and exhibit a minor or no dispersing effect on the clustered ropes, confirming the negative results of the prior art, mentioned above. Other types of surfactants, at various concentrations have been checked, for example SDS, cetyltrimethyl ammoniumchloride (CTAC), dodecyltrimethylammonium bromide (DTAB), pentaoxoethylenedodecylether ($C_{12}E_5$), dextrin and polyethyleneoxide (MW about 300,000). None of the materials acted as an efficient dispersing agent for nanotubes in aqueous solutions, and even the best of them could not even stabilize 0.35% (weight percent, in water) suspension of carbon bundles, under the conditions where GA resulted in 50% dispersion of single carbon nanotubes.

To test the aggregation state of the tubes in the dispersion, X-ray scattering measurements of carbon tubes coated with GA were performed. The typical peaks which characterize the inter-tube packing within the ropes of as-produced SWNT disappeared in polymer-coated carbon tubes according to this invention (see FIG. 1). The microscopic structure of the stable dispersions was investigated using cryo-transmission electron microscopy (cryo-TEM). Cryo-TEM images show well separated single tubes, 2-3 nm in diameter (see FIG. 4). Such tubes can be clearly observed in suspensions both before and after drying and re-suspension. These observations demonstrated that adsorption of the GA leads to complete disruption of the inter-tube interactions in the crystalline ropes. Complementary evidences for the GA adsorption are given by FTIR measurements of the dried SWNT powder. The characteristic peaks due to carboxylate anion of the pure GA appear also in the dry SWNT powder (FIG. 5a).

Hence, the present invention relates to a method for the preparation of a dispersed aqueous suspension of carbon nanotubes, comprising adding to an aqueous medium, prior to the addition of carbon nanotubes or thereafter, a water-soluble polymeric material, thereby to separate the nanotubes into dispersed, essentially single tubes. Further, the present invention relates to a method for the preparation of dry nontangled carbon nanotubes comprising dispersing nanotubes in an aqueous solution of a polymer as described above, and drying this dispersion.

The invention is also directed to the use of the carbon nanotubes in suspension or in powder in all applications where essentially single carbon tubes are required.

Based on the above findings, the present invention enables testing of single-tube properties, and comparisons to theoretical predictions. From the practical point of view, the ability to prepare a dry powder of single tubes, well separated by a polymeric spacer, offers a by-pass to the tedious efforts involved in separating single tubes from an as-synthesized powder.

A possibility to prepare suspensions or powders of separated carbon nanotubes with defined properties, and controlled concentrations, enables to introduce the carbon nanotubes easily to any system, in any form and quantity, using known techniques for manipulating and portioning liquids and powders. This has direct applications in printing, coatings, thin layers, and molecular machines.

Since the polymer adsorbed on the carbon tubes acts as a compatibilizer, marked improvements can be achieved in the quality of the interface between nanotubes and the matrix. The long chain polymers, may serve as adhesion promoters leading to the formation of highly adhesive interfaces between the tubes and a polymeric matrix. It is well known that the typical adhesive fracture energy of a polymer-straightened interface is of the order of $10^2$-$10^3$ $J/m^2$, about a 100 times higher than the fracture energy of a carbon-carbon plane. Thus, in one aspect, the invention also relates to the provision of a highly adhesive interface between carbon tubes and the polymeric matrix.

It is well known in material science that composite materials, comprising particles of one component homogeneously dispersed in a continuous phase, wherein the particle dimensions are in the order of nanometers, exhibit special mechanical properties. The main obstacle in producing these materials, called nanocomposites, is to overcome strong adhesive forces between the particles. The polymer coated carbon nanotubes according to the invention can be directly used in the production of nanocomposites, because of their excellent dispersion properties. Therefore, the invention further relates to the use of carbon nanotubes in the production of new composite materials. In one preferred embodiment, carbon nanotubes serve as an reinforcing agent in a polymer matrix. The preferred polymeric matrix in this embodiment is an elastomer.

Figure 4:
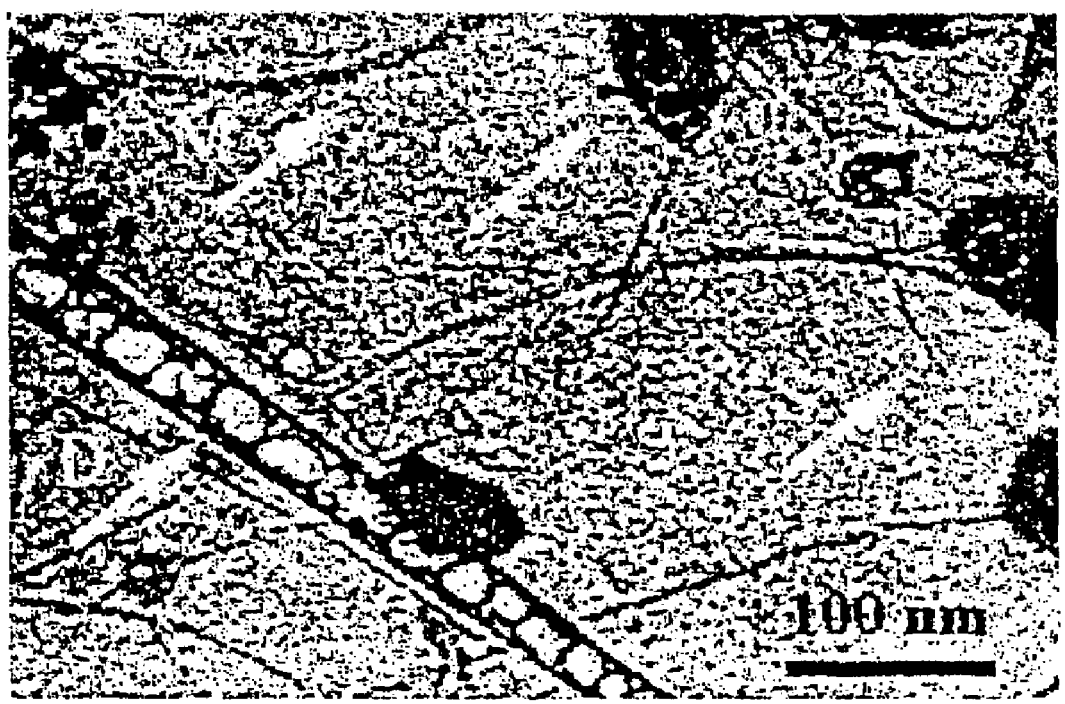
FIG. 4 Is a cryo-TEM micrograph obtained from a dispersion of SWNT. The dispersion was prepared by re-dispersing a dried powder of GA coated carbon nanotubes in pure water. The powder was prepared by drying an aqueous solution of 15% GA and 3% SWNT. The arrows indicate flexible SWNT (S), the Co/Ni catalyst (C), radiation damage of the lacey support (D), and a Multiwall Nanotube (M)
Figure 5:
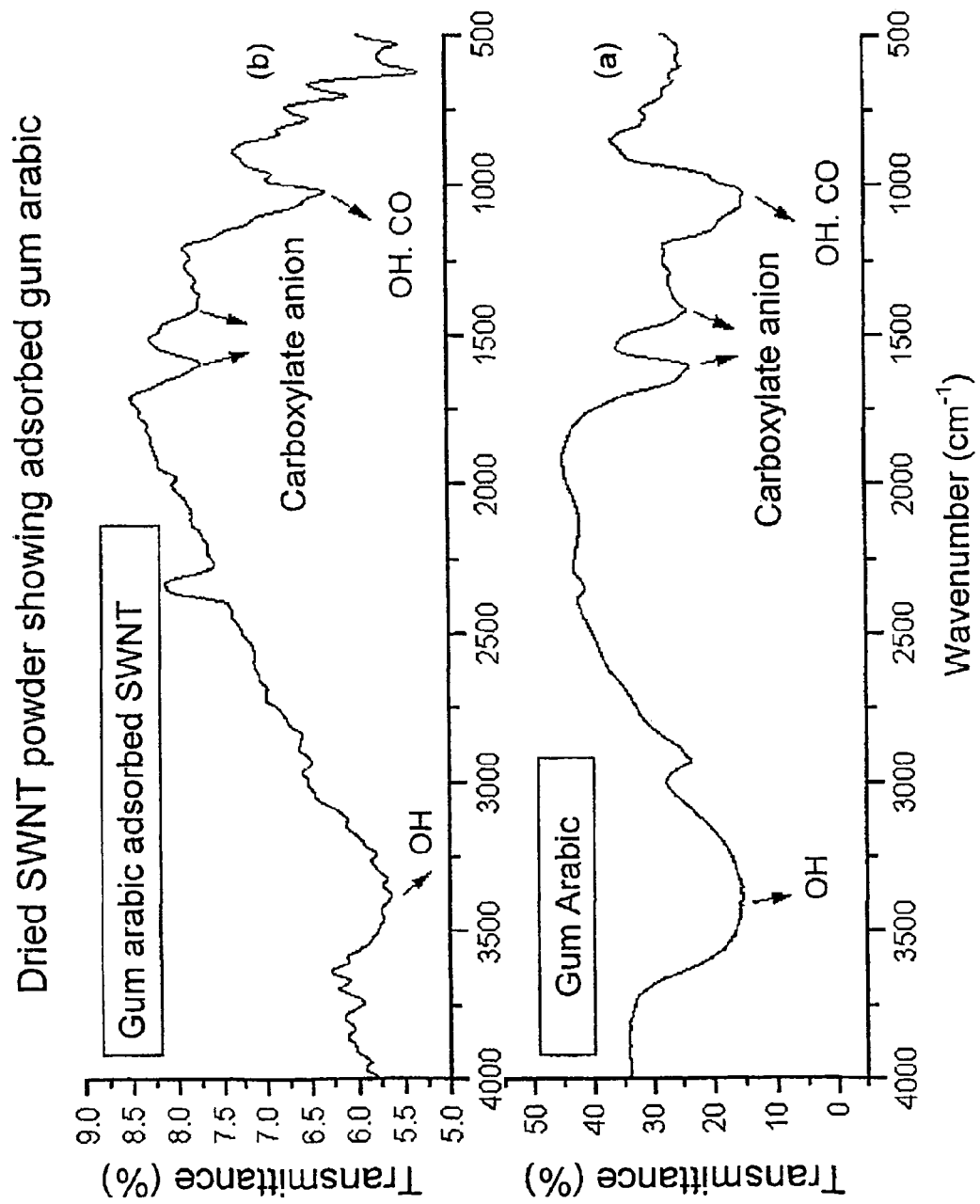
FIG. 5 shows FTIR spectra of (a) pure GA, and (b) dry SWNT prepared according to Example 2. The samples were prepared by mixing the relevant material with KBr in a ratio of 5:100.

It has been further shown that the suspensions of carbon nanotubes, prepared as described above, exhibit the presence of carbon nanotubes of 2-3 nm in diameter (FIG. 4). The single-wall carbon nanotubes, as was described above, exhibit superb electrical properties. The invention is therefore also related to the deposition of nanotube powders or of droplets of nanotube dispersions at a relevant location in an electronic array, where the tubes can serve as nanocontacts. The invention thus relates to the use of suspensions or powders of carbon nanotubes for creating an electric conductive connectors between two electronic devices, wherein one of the devices, or both of them, are nanoelectronic devices.

The present invention also relates to the use of a suspension or a powder of carbon nanotubes either for depositing carbon nanotubes onto a solid support in a required pattern, or as a template for the growth of crystals of silica or a hybrid material of silica with carbon nanotubes.

The present invention further relates to the use of a suspension or a powder of carbon nanotubes in a technique that comprises the formation of a thin layer. Said technique is preferably printing or coating.

The mechanism by which a polymer stabilizes the nanotube dispersions is based on the introduction of repulsive forces between adsorbed polymer chains. Both electrostatic and entropic repulsion, according to the composition of the mixture may play a role. Anyway, the introduction of a simple method for the preparation of polymer-coated tubes can remove a serious obstacle on the way to the mass production of ready-made nanotube-based additives, to be used in fields of printing, coatings, thin layers, molecular machines, reinforced elastomers and electronics.

EXAMPLES

Example 1

Gum arabic (Sigma) was dissolved in pure water to 15% (weight percent), and powder of as-produced nanotubes (from Carbolex, University of Kentucky, Lexington, Ky., USA) was added to 3 wt %. The mixture of 2 ml was then sonicated for 20 minutes. A homogeneous dispersion of SWNT was obtained. The suspension, that had an ink-like appearance, was stored at ambient temperature, and checked periodically for visual changes. The dispersion remained unchanged after four months, and the nanotubes did not settle when centrifuged at 4500 rpm for 30 minutes.

Example 2

10 ml of suspension, prepared as in Example 1, were evaporated in 20 ml flask yielding about 1.7 grams of fine black powder of polymer-coated SWNT. The powder was re-dispersed in 1.7 ml of pure water to obtain an ink-like homogeneous dispersion, which was stable.

Example 3

Figure 3:
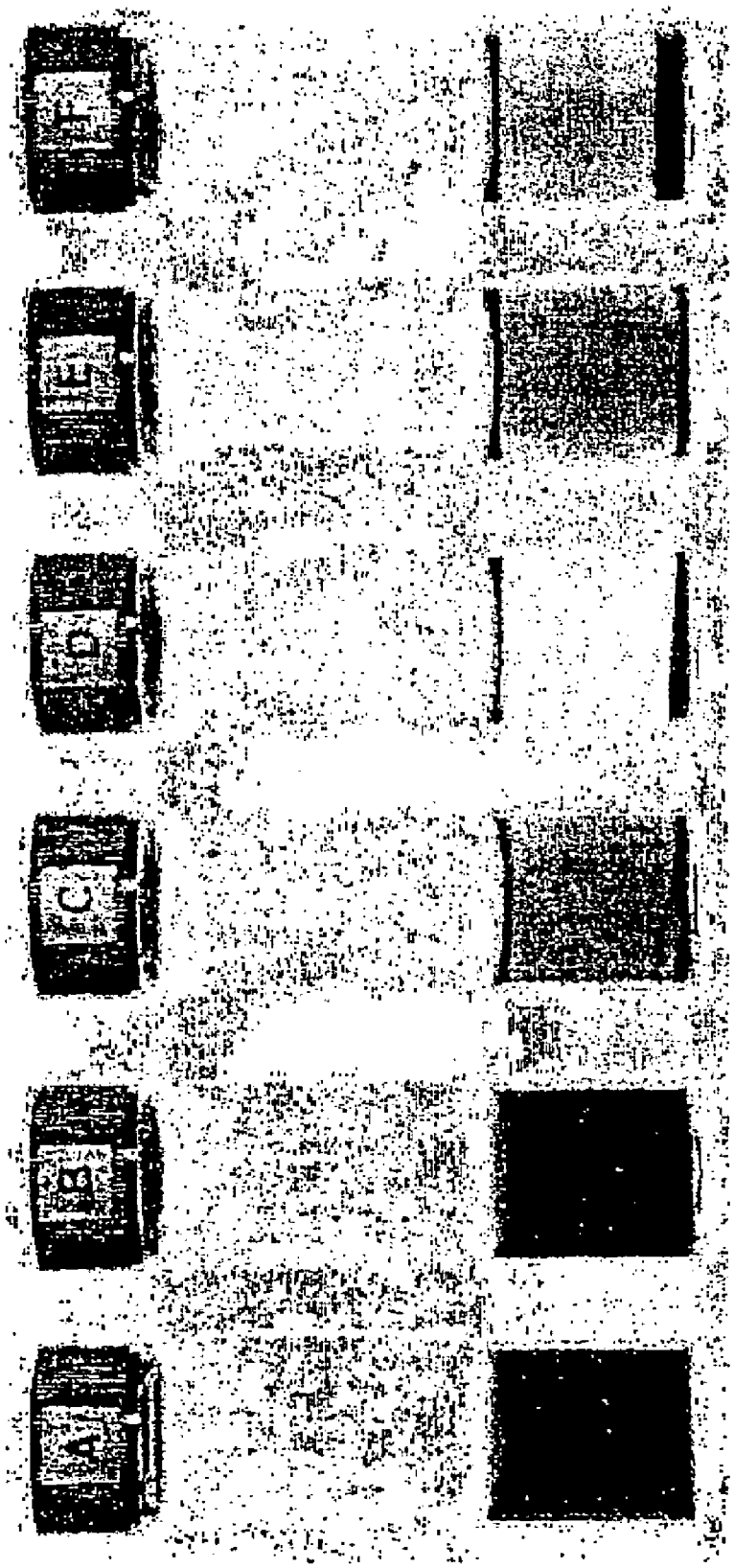
FIG. 3 Shows the appearance of 0.05 % (weight percent) SWNT dispersions in different aqueous solutions after 2 months: (A) 2% GA, (B) 5% GA, (C) 5% SDS, (D) 15% SDS, (E) 5% CTAC, (F) 15% CTAC.

The following solutions were prepared: (A) 2% GA , (B) 5% GA, (C) 5% SDS, (D) 15% SDS, (E) 5% CTAC, and (F) 15 t % CTAC. Deionized water was used, SDS and GA were purchased from Sigma, CTAC from Aldrich. 10 ml of each solution were placed to a glass tube, 5 mg of polymer-coated SWNT, prepared as in example 2, were added to each tube, and the mixtures were sonicated. The tubes were then stored at ambient temperature and were visually checked for changes at intervals. In case of SDS and CTAC, their high concentration notwithstanding, a dark sediment appears within minutes to hours. Only in case of gum arabic, in both concentrations, the suspension was stable, as seen in FIG. 3.

Example 4

Powder of as-produced nanotubes (from Carbolex) was characterized by X-ray scattering, using Philips x-ray powder diffractometer (PW-1050/70), employed at 40 kV/28 mA with Cu Kα (radiation wavelength λ=0.154 nm) radiation and graphite monochromator, the scattering vector being $q=4\pi/\lambda \sin\theta$, θ being the scattering angle). FIG. 1a shows wide angle x-ray spectra of rope structure of a two-dimensional triangular lattice of SWNT with a lattice constant of 1.8 nm, and with evidence of multi-wall graphitic objects, which is in agreement with Thess et al. (P. Thess et al., Science 273 (1996) 483). FIG. 1b shows wide angle x-ray spectra of polymer-coated SWNT prepared as described in Example 2. The inset shows the reflections of the Co/Ni catalyst which is used in the synthesis of nanotubes. It can be seen that the inter-tube reflections, seen in FIG. 1a, disappear in FIG. 1b as a result of dispersing the rope structure to single individual carbon nanotubes. The two peaks, corresponding to graphite, may reflect presence of certain amounts of multiwall nanotubes in the as-prepared powder.

Example 5

The microscopic structure of the SWNT dispersions was investigated using cryo-transmission electron microscopy (cryo-TEM). The powder of Example 2 was re-dispersed in deionized water, 180 mg in 1 ml, and a drop of this dispersion was placed on a lacey TEM-grid on FORMVAR and vitrified in liquid ethane. The sample was imaged at −170° C. using JEOL 1200EXII TEM equipped with a Gatan 626 coldstage which preserves the structure of the objects formed in the liquid phase. FIG. 4 presents a cryo-TEM image of the re-dispersed nanotubes. Well separated single tubes, 2-3 nm in diameter, are clearly observed (arrow with "S" in FIG. 4). Thicker, multiwall nanotubes can be also observed (arrow with "M").

Example 6

Powder of as-produced nanotubes (from Carbolex) was analyzed by Scanning Electron Microscope (JSM-35CF, JEOL, operated at 25 kV). A micrograph of powder of Au-spattered, as-received nanotubes shows flexible ropes in randomly oriented networks. The arrow indicates a single rope.

Example 7

The powder of Example 2 was compared to GA by FTIR measurement. FTIR spectra of pellets, made with KBr, of pure GA (a), and the SWNT powder (b) were measured by Nicolet Protégé 460 spectrometer. FIG. 6 indicates that GA adsorbs to SWNT.

Modifications and variations of the present invention, as described above and illustrated in the examples, are possible. The invention can be applied to the dispersal of carbon nanotubes, that were prepared by various procedures, wherein various suitable polymers can be used. The nanotubes may be used as a suspension or as a powder. The nanotubes may be used as an microelectronic element, as a template for crystal growth, as a component in composites, in printing, coatings, thin layers, molecular machines, etc. It is therefore understood that within the scope of the appended claims, the invention may be realized otherwise than as specifically described.

What is claimed is:

1. A method for the preparation of an aqueous, stable suspension of essentially single, non-tangled carbon nanotubes that is ready-for-use, comprising:
    adding carbon nanotubes to a water solution of a charged, hydrophilic polymeric material selected from the group consisting of polysaccharides and polypeptides;
    maintaining a mass ratio of said polymeric material to said carbon nanotubes in a range between 0.05 to 20; and
    sonicating said solution including said carbon nanotubes without including further surfactants wherein the time of said sonicating comprises 5 to 20 minutes; thereby obtaining a ready-for-use suspension of carbon nanotubes.

2. A method for the preparation of dry non-tangled carbon nanotubes comprising: i) the preparation of an aqueous suspension of carbon nanotubes according to claim 1; and ii) the removal of water from said suspension.

3. A method of claim 2, wherein the removal of water comprises evaporation, lyophilization, or filtration.

4. A method according to claim 1, wherein a sum of a concentration of said carbon nanotubes and a conceentration of said polymeric material in the suspension is up to 65% weight.

5. A method according to claim 1, wherein said polymeric material is selected from the group consisting of gum arabic, carrageenan, pectin, polygalacturonic acid, alginic acid, chitosan, combinations thereof and derivatives thereof.

6. A method according to claim 5, wherein said polymeric material is gum arabic.

7. A stable suspension of carbon nanotubes, prepared according to claim 1.

8. The method of claim 1 wherein said carbon nanotubes added to the water solution are as-produced and without chemical modification.

9. A powder of carbon nanotubes, comprising a polymeric material in admixture therewith, obtained by the method according to claim 2.

10. The powder of claim 9, wherein said polymeric material is adsorbed on the nanotubes forming an adhesive interface between said carbon nanotubes and said polymeric material.

11. Use of the carbon nanotubes of claim 7 for creating a required conductive pattern, comprising: i) providing a solid support, and ii) depositing carbon nanotubes onto said solid support in a required conductive pattern.

12. Use of the carbon nanotubes of claim 7 as a template for the growth of crystals of silica, or a hybrid material of silica with carbon nanotubes, comprising: i) providing a silica containing material, and ii) contacting said material with said carbon nanotubes.

13. Use of the carbon nanotubes of claim 7 as a reinforcing agent for polymeric matrices, comprising: i) providing a silica containing material, and ii) contacting said material with said carbon nanotubes.

14. Use of the carbon nanotubes according to claim 13, wherein the polymeric matrix is elastomer.

15. Use of the carbon nanotubes of claim 7 as an electric conductive connector between two electronic devices, comprising: i) providing two eletronic devices, and ii) depositing said carbon nanotubes between said device to create a continuous pattern.

16. Use according to claim 15, wherein at least one of the devices is a nanoelectronic device.

17. Use of the carbon nanotubes of claim 7 in a technique that comprises the formation of a thin layer on a surface, comprising: i) providing a solid surface, and ii) depositing said carbon nanotubes onto said surface in a pattern enabling at least a partial cover of said surface by a layer of said nanotubes.

18. Use according to claim 17, wherein the technique is printing.

19. Use according to claim 17, wherein the technique is coating.

* * * * *